(12) United States Patent
Morrison

(10) Patent No.: X8553
(45) Date of Patent: Dec. 23, 1834

(54) BELLOWS, SMITHS' & FURNACE FIRES

(76) Inventor: John R. Morrison

John R. Morrison
Letters Patent (Patented Dec. 23. 1834)

The schedule referred to in these Letters Patent and making part of the same, containing a description in the words of the said John R. Morrison himself of his Improvement in a Bellows for blowing Smith's and furnace fires

---

To all to whom these presents shall come: Be it known, that I, John R. Morrison, of Springfield, Jefferson County, and State of Ohio, have invented a new and useful Improvement in a Bellows, for blowing smith's and furnace fires, of which the following is a full and exact description of the construction of the said Bellows, invented or improved by me.

A square box is to be constructed of pine or other suitable plank of 1 1/4 inches in thicknes, of 2 feet and 10 inches in length, and 2 feet 3 inches in width and 15 inches in depth in the clear, having a division board framed in it of pine or other suitable plank of the thickness of 1 inch, one inch below the centre in a horizontal maner . having two vacuums or spaces, the under vacuum being 6 1/2 inches in depth and the upper vacuum 7 1/2 inches in depth - there are two holes 4 inches square, cut through the division board, 12 inches apart, on which there are valves or wind falls placed. There is a spout constructed of plank of one inch in thickness - the same to be 2 feet 4 inches in length 4 by 6 inches at one end, and tapering to 3 inches square at the other end, in the clear, in which there is an iron pipe of the usual kind introduced four inches and there made fast by an iron band and wedge. there is a square hole cut in the end of the box, above the division board large enough to receive the large end of the spout, in which it is placed and made fast by nails and glued blocks. there are two heads made of pine or other suitable plank of the thickness of 1 inch, one of which is two feet in length & 17 inches in width, and called the upper head, the other is 2 feet and 2 inches in length, & 19 inches in width, and called the lowerhead, having one or more battens nailed across each of them - the lower head has two holes 4 by 5 inches square, each set 6 inches distant from the other, on which there are valves placed for the purpose of admitting one into the lower vacuum. The upper head has a strap of suitable leather eight inches in width, tacked round its edge, which is cut in a mitering shape at each corner of the head, and sewed and tacked to the uper edge of the box and made tight. Thus closing the uper vacuum of the box. the under head has a strap of suitable leather 7 inches wide tacked round its edge and cut, sewed, & tacked to the lower edge of the box in a similar maner to that of the uper head, and is suspended under said box. the uper head has in its centre a piece of wood 2 inches in diameter and 8 inches in length extending upright, having a hole 5/8 of an inch in diameter passing through its centre, and there is a round rod of iron 2 feet 2 inches in length and 5/8 inches in diameter, with a screw cut on the lower end, and a hook or eye on the upper end, which passes down through the hole of the projecting piece of the upper head, passes through a hole made for that purpose in the centre of the division board, and screws into a nut which is fastened in the centre of the lower head. The Bellows being thus finished, is placed on a frame and there made fast, and the uper end of the rod is attached to a lever or pole which may be worked either by the hand or foot as in the usual way, by raising the lower head in a perpendicular manner, forcing the one through the valves in the division board, raising the uper head in the same manner, which keeps up a constant & strong blast.

My claim is for the whole bellows as above described, excepting the pipes and valves. — In testimony that the foregoing is a true Specification of my Bellows, as invented or improved by me, I have hereunto set my hand this 29th, day of October in the year of our Lord one thousand eight hundred & thirty four Witnesses John R. Morrison William Duffield 6yd.

John Winklepluck 1146.

(804 wds)

---

2375 John R. Morrison

Letters Patent (Patented May 13. 1834.)

The schedule referred to in these Letters Patent, and making part of the same, containing a description in the words of the said John R Morrison himself of his improvement in the Machine for boring out the inside of the hubs of wheels, and also in boring out the opening for the boxes and linch cups.

To all to whom these presents shall come: Be it known that I, John R. Morrison, of Springfield, Jefferson County, and State of Ohio, have invented a new and useful improvement in boring out the inside of the hubs of wheels, and also in boring out the opening for the boxes and linch cups and that the following is a full and exact description of the construction and operation of the said Machine, as invented or improved by me..

A bench is to be constructed of suitable hard stuff of about 22 inches in height supported by four legs. The top to be of about 12 inches in breadth by 14 1/2 in length and 1 1/4 inch in thickness. In the centre of this top board, is to be formed a hole quite through, and from the same centre are to be marked out a number of circles of different sizes. At each end of the length of this top board, is to be attached to the under side an iron hook or projection bending down wards, for the purpose of hooking fast to an iron rod, which has its lower end flattened and perforated with holes for that purpose, these rods of which there are two, of about two feet in length, one at each end, rise perpendicularly to the cast iron frame above, and have at their top end, each a screw and nut. This cast iron circular frame, is to be of about 10 inches in diameter outside, by about 1/4 inch by 1/8 in thickness square. On a line with the diameter, and projecting beyond the outside of said frame, are to be formed two projections of the same thickness as the rest of the frame, opposite to each other, having at the end of each a groove for the purpose of receiving the end of the rod, and its nut above described; at the other end of the projection, in the part joining the circular frame, is another groove, in the line of the diameter of about 1/4 inch in length and about 3/8 in width for the reception of screw bolts to slide in. Beneath these grooves, and to the under side of the frame is secured to each a ring of cast iron, by means of the bolt and groove just described, and by which it may be turned into presenting either side required towards the mandrel. These sides are to be formed into concave circles of different circumferences to each. About half way between these projections is to rise from the frame in an oblique line, tending to the centre, an arm of the same metal of about 3 inches in height, having the top flattened, in a plane parallel to that of the frame presenting a surface of about 2 inches in diameter, with a hole through the centre, immediately over this hole, and on this flat surface rests a die frame, consisting of a long flat piece of metal about 5 inches in length, and 2/4 in width having in one end a groove of about 1 1/4 inch long by 1/2 inch;
and the other end formed into a square frame of about 1 3/4 inch square
inside with small flanges across the bottom corners to support the die, and
in one corner a square groove of about 1/2 inch wide to allow the screw
head in the mandrel to pass through, this piece is for the purpose of
adjusting and securing the mandrel to its proper place by means of
the groove and bolt, In this die frame rests a die made of pewter or
other suitable metal, having in the centre a hole sufficiently
large to admit the mandrel.

The mandrel passes down through this die, and through the
hub and top of the bench, it consists of a long round shaft of iron
of about 3 feet in length by about 1 1/4 inch in diameter, having
in the centre a swell of about 1/4 inch, rising from the outside of
the shaft through this swell, is formed a hole of about 1/2 inch square,
for the reception of the bit, being cut through on a slope of about
1/8 of an inch to prevent the opposite end from bearing on the wood;
half way round the swell is a screw hole for the purpose of se-
curing the bit, the top of the mandrel is squared and receives
a crank by which it is to be turned; the opposite end has a square
hole to fit on the regulating screw beneath. This regulating screw
consists of a screw rod of about 10 inches in length by 1/2 inch
in diameter, having at each end a square to fit into the mandrel,
so that as the mandrel turns, the screw turns, and thereby reg-
ulates the speed w. to which the bit cuts. The screw works in a
nut and thumb screw by which it may be tightened to any spot
up or down a groove, secured in an upright position beneath
the bench to which it joins and descends to the length of the legs.
The hub of a wheel being placed on the bench top and secured
by the machine, the mandrel is let down through the die,
the bit is then secured, and the lower end fitted to the regu-
lating screw, the bit resting on the hub, the crank is now turned
and the boring commenced and is continued as deep as n-quisite, the mandrel is then raised, the bit advanced to a sufficient projection to cut out as much more as to let in the box, the boring is then recommenced and continued to the depth of the box. The hub is now turned, and the other end bored. A small band, called a gauge collar formed to fit the mandrel, slides on the upper end of the mandrel above the die, and may be secured in any part of the length by a screw turning through it, it serves by being screwed to the mandrel to stop the boring at the desired point. A thin circular plate, with a hole the size of the mandrel in the centre, is laid on the top of the hub, and when the mandrel passes through it, serves to shew by its circumference, on the wings, the centre of the hub. My claim is for the whole machine as above described.

In testimony that the foregoing is a true specification of my machine as invented by me, I have hereunto set my hand this seventh day of May, in the year of our Lord Eighteen hundred and thirty four.

John R. Morrison

Witnesses
C. H. W. Wharton
Henry Stone

Exd. (1224 words)
H.G.C.